United States Patent

[11] 3,579,127

| [72] | Inventor | Harold A. Thomas<br>San Diego, Calif. |
|---|---|---|
| [21] | Appl. No. | 642,390 |
| [22] | Filed | May 31, 1967 |
| [45] | Patented | May 18, 1971 |
| [73] | Assignee | Gulf Energy & Environmental Systems, Inc.<br>San Diego, Calif. |

[54] APPARATUS FOR MONITORING PULSES
5 Claims, 3 Drawing Figs.

[52] U.S. Cl. .................................................. 328/145,
250/83.6, 307/229
[51] Int. Cl. ...................................................... G06g 7/24,
G01t 1/15
[50] Field of Search............................................ 176/19;
324/81; 328/140, 110, 154, 143, 157; 250/83.1,
83.6; 328/145

[56] References Cited
UNITED STATES PATENTS

| 2,577,506 | 12/1951 | Belleville | 328/145 |
| 2,762,974 | 9/1956 | Pulsford | 328/145 |
| 2,935,687 | 5/1960 | Eschner | 328/145 |
| 3,234,404 | 2/1966 | Peters | 328/145 |
| 3,235,807 | 2/1966 | Appel | 328/116 |
| 3,300,719 | 1/1967 | Thomas | 307/233 |
| 3,435,353 | 3/1969 | Sauber | 328/145 |

Primary Examiner—Donald D. Forrer
Assistant Examiner—Harold A. Dixon
Attorney—Anderson, Luedeka, Fitch, Even and Tabin ABSTRACT: Apparatus is described for producing an output signal generally proportional to the log of the rate of random pulses, which rate varies over a total pulse-rate range of sufficient magnitude as to require at least two different monitoring techniques. Means utilizing the respective techniques are provided for producing log signals representing the pulse rate of the random pulses in lower and upper portions of the total pulse-rate range. The log signals representative of the pulse rate in the respective ranges are adjustable to have the same proportional relation to the log of the pulse rate. The relative amplitudes of the two log signals are also adjustable such that a continuous and coherent output may be provided over the total pulse-rate range.

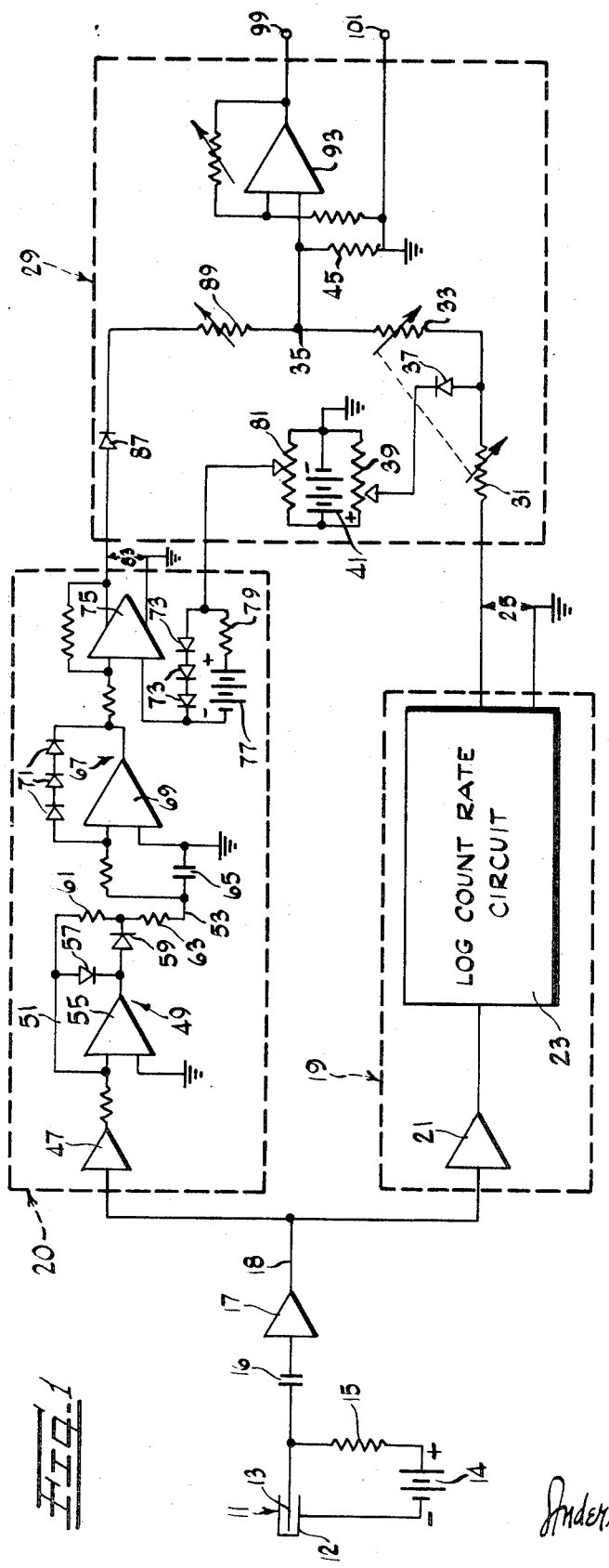
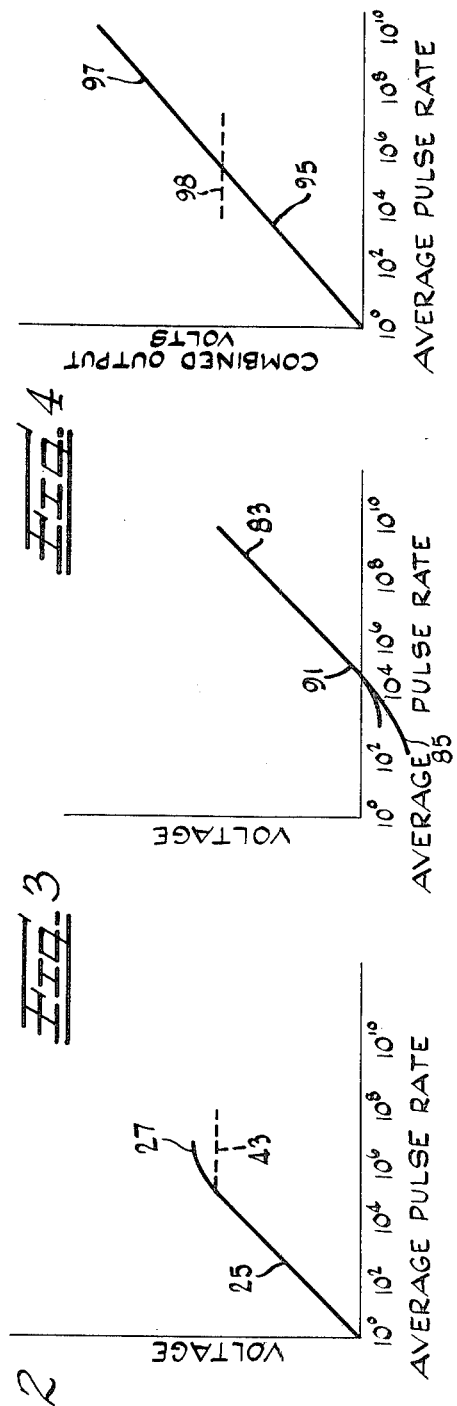
INVENTOR
HAROLD A. THOMAS
Anderson, Luedeka, Fitch, Even, & Tabin
ATTORNEYS

APPARATUS FOR MONITORING PULSES

This invention relates generally to apparatus for monitoring randomly occurring pulses. More particularly, the invention relates to apparatus for producing an output signal generally proportional to the log of the average rate of random pulses, which average rate varies over a total pulse-rate range which is sufficiently extensive as to require at least two different techniques for producing log signals related to the random pulses.

The instrumentation of some types of systems requires the monitoring of randomly occurring events. This is particularly true in systems which require the monitoring of various types of radiation. Generally, such systems include a device capable of sensing the randomly occurring events and producing a current or voltage pulse corresponding to each event. The pulses thus produced may then be monitored and, where a wide pulse-rate range (e.g. 1 to $10^{10}$ pulses per second) is to be covered, a log output may be derived to make it easier to monitor over several decades (powers of ten) of pulse rate change.

Random pulses occurring at generally low rates, for example, below the range of $10^4$ to $10^6$ pulses per second (pps), may usually be monitored by counting techniques. Such techniques are used to produce an output corresponding in amplitude to the average rate of the randomly occurring pulses or to the log of the average pulse rate. This may be accomplished by the use of discriminator and counting circuitry well known to those skilled in the art. If the discriminator circuitry is followed by a log diode pump circuit a signal corresponding to the log of the pulse rate is obtained thereby permitting continuous monitoring over several decades. Circuits for producing such an output are commonly known as log countrate circuits.

For random pulse rates generally above the range of $10^4$ to $10^6$ pulses per second, the resolution of known counting techniques is often unsatisfactory. However, monitoring techniques not requiring pulse resolution may be used in this higher rate region. In accordance with Campbell's theorem, the average response of a circuit to a series of randomly occurring pulses is equal to the average rate times the integral from minus infinity to infinity of the response of the circuit to a single pulse; and the mean square response is the average rate times the integral from minus infinity to infinity of the square of the single pulse response. Circuits constructed to utilize the second principle set forth above by Campbell are generally referred to as "Campbelling-type circuits" and have the advantage of good discrimination against gamma pulses because of the squared value of the pulse that is involved. However, such circuits are often unsatisfactory for use below about $10^4$ pulses per second because of background noise pulses, or pulses from undesired background radiation.

Although a Campbelling-type circuit would seem to require detection circuitry sensitive to the mean square value of the randomly occurring pulses, it has been pointed out by Gwinn and Trenholme in an article entitled "A Log N and Period Amplifier Utilizing Statistical Fluctuation Signals from a Neutron Detector" appearing in IEEE Transactions on Nuclear Science, Volumes NS–10, No. 2, Apr. 1963, that the average rectified value obtained by linear detection of a random AC signal is proportional to the RMS value, for relatively high average pulse rates where pulse overlap is achieved. Thus, an output corresponding to the RMS value of the randomly occurring pulses may be produced by utilizing a linear detector and suitable filter. (In accordance with the present invention, the RMS value is squared to obtain the equivalent of the mean square value, which is proportional to the radiation flux.) As suggested in the foregoing article, a separate amplifier stage, averaging rectifier, filter, and biased diode limiters, is provided for each decade to be covered. Naturally, such a technique is somewhat complex and may add considerable expense to a system.

When randomly occurring pulses are to be monitored over a relatively wide pulse-rate range, for example more than six decades, it may be desirable to switch from one monitoring technique to another somewhere in the wide pulse-rate range. For example, both counting and Campbelling-type techniques may be utilized in the circuitry to cover the wider range. This is because, as has been previously pointed out, counting techniques lose resolution at higher pulse rates and Campbelling-type techniques are unsatisfactory at lower pulse rates.

Under some circumstances there may be disadvantages in utilizing two different monitoring techniques. This is particularly true in connection with the monitoring of neutron flux in a nuclear reactor. Separate neutron flux detectors and usually separate instrument wells through the biological shield to or into the reactor have sometimes been required for monitoring the full range of neutron flux. Since detector instrument wells are often difficult and expensive to build into a reactor system, and since neutron detectors and associated electronics are generally expensive, it is desirable that monitoring over a full range of neutron flux be possible by utilizing one detector and one instrument well. Moreover, it is desirable that a single output signal be available for the entire range in order that it be unnecessary for an operator to carefully observe his indicating instruments and switch between the various monitoring techniques at critical levels, particularly during the startup period of a nuclear reactor when the neutron flux may vary over a range of as much as 10 decades or more.

It is therefore an object of this invention to provide apparatus for producing an output signal generally proportional to the log of the average rate of random pulses, which rate varies over a pulse-rate range of sufficient magnitude as to require at least two different monitoring techniques.

Another object of the invention is to provide improved apparatus for monitoring neutron flux in a nuclear reactor.

Another object of the invention is to provide apparatus for monitoring randomly occurring pulses which vary over a wide pulse-rate range, such apparatus being relatively simple and low in cost.

A more particular object of the invention is to provide apparatus having one output for monitoring randomly occurring pulses and which combines counting and Campbelling-type techniques with reliable and accurate changeover and with no time delays or abrupt changes in output. An additional object is to combine the Campbelling and counting response outputs in such a way that the inaccurate portion of each response is eliminated from the combined response output.

Other objects of the invention will become apparent to those skilled in the art from the following description taken in connection with the accompanying drawings wherein:

FIG. 1 is a schematic representation of an apparatus constructed in accordance with the invention;

FIG. 2 is a graph illustrating an intermediate signal produced in one channel of the apparatus of FIG. 1;

FIG. 3 is a graph illustrating an intermediate signal produced in the other channel of the apparatus of FIG. 1; and FIG. 4 is a graph illustrating the output signal of the apparatus of FIG. 1.

Very generally, the apparatus of the invention operates to produce an output signal proportional to the log of the average rate of random pulses, which rate varies over a total pulse-rate range of sufficient magnitude as to require at least two different monitoring techniques. A first intermediate signal is produced which is proportional to the log of the pulse rate of the random pulses in a predetermined lower portion of the total pulse-rate range. A second intermediate signal is produced which is proportional to the log of the average pulse rate of the random pulses in a predetermined upper portion of the total pulse-rate range. The first and second intermediate signals are adjustable so as to bear the same proportional relation to the log of the average pulse rate. The amplitudes and the levels at which the two intermediate signals can be limited and combined are also adjustable. A combining or summing output circuit is provided producing a single output from both the first and second intermediate signals so that the output signal is thereby a linear, continuous signal which is proportional to the log of the average pulse rate over the entire pulse-rate range.

Referring now more particularly to FIG. 1, a preferred embodiment of the invention is illustrated. The particular illustrated apparatus is for monitoring neutron flux in a nuclear reactor, but it is to be understood that the invention is not limited to such a purpose.

In a nuclear reactor, neutron flux is frequently sensed by means of a fission chamber (or a boron chamber). A fission chamber 11 is illustrated in FIG. 1 and comprises a pair of electrodes 12 and 13 arranged in a suitable configuration known in the art. A DC bias voltage is maintained across the electrodes by an adjustable DC source 14 in series with an impedance 15. Incident neutron radiation falling upon the $U_{235}$ or boron coated electrodes of the detector produce ionizing particles of considerable energy. The positive ions and the electrons created by these ionizing particles are accelerated across the gap giving rise to a current pulse. The collection time of the electrons is quite short (usually a fraction of a microsecond) giving rise to high frequency components in the pulse and the collection time of the positive ions (being thousands of times greater) produces the low frequency components of the current pulse.

The average number of current pulses per second produced in the chamber is proportional to the incident neutron flux, although the time between pulses follows a statistical distribution. The average pulse rate of current pulses from the chamber is proportional to the level of the incident neutron flux and therefore, in ordinary practice, proportional to the power level of the reactor.

Current pulses are passed through capacitor 16 to an AC preamplifier 17. The capacitor serves to block the DC component from the source 14. The AC preamplifier 17 converts the current pulses to output voltage pulses at low impedance. This amplifier is a broad band amplifier and passes most of both the low and high frequency components of the current pulse originating in the chamber 11. The output signals from the preamplifier 17 are transmitted through a coaxial cable 18 to the main body of the amplifier, usually located remotely, which includes two channels 19 and 20. One of the channels 19 comprises a low frequency band-pass amplifier 21, which passes the low frequency components of the current pulse (i.e., those due to electron collection), feeding a conventional log count rate circuit 23. The details of such log count rate circuits are well known in the art and will not be discussed here. The output voltage 25 of this channel 19 is indicated by the curve 25 in FIG. 2 and is a voltage proportional to the log of the average pulse rate. As is indicated in FIG. 2, there is a loss in voltage output at the upper end 27 of the response curve 25 due to resolution counting loss.

As shown in FIG. 1, the output of the log count rate circuit 23 is then fed into a combining circuitry 29. Specifically, the log count rate output signal 25 is passed through a pair of ganged, series connected adjustable resistors 31 and 33 to a combining or summing point 35. By means of these adjustable resistors 31 and 33, the current resulting from the log count rate output 25 and flowing into summing point 35 may be adjusted thereby changing the slope of the response curve at the summing point 35. A diode 37, which is biased by an adjustable potentiometer 39 connected across a DC power source 41, is connected to the common point between resistors 31 and 33, serves to cut off or limit the output voltage 25 at some chosen point or level, indicated by the dotted line 43 in FIG. 2, below the point at which the above mentioned resolution counting loss occurs. Hence, the voltage developed across a resistor 45, connected between the summing point 35 and ground due to the current flowing into summing point 35, as a result of the output voltage 25, has the characteristic 25 and 43 as shown in FIG. 2.

In the illustrated embodiment, the output of the chamber 11 and preamplifier 17 is also fed to the other channel 20 which includes a Campbelling-type measuring circuit. The output of the preamplifier 17 is coupled to a high frequency band-pass amplifier 47 which amplifies the AC components of the current pulse which are primarily those due to positive ion collection in the chamber and which lie in the range of 8 to 60 kiloHertz. The amplified AC components are fed into a linear detector, or averaging rectifier 49, so called because it produces an output proportional to the rectified average of the AC components rather than the root mean square or the mean square value of the AC components. The illustrated linear detector 49 comprises a half-wave-type rectifier 51 followed by an averaging filter circuit 53. The rectifier includes an operational amplifier 55, a pair of diodes 57 and 59, and a feedback resistor 61 and the filter circuit includes a series connected resistor 63 and capacitor 65.

The rectified average of the AC components is fed into a logging amplifier 67 comprised of an operational amplifier 69 and three logging diodes 71 in the amplifier feedback circuit. (The number of diodes used in a specific circuit is determined by the magnitude of the output voltage desired.) This logging amplifier 67 has an output voltage which is proportional to the log of the input current and therefore proportional to the log of the output of the linear detector 49. It has been shown in the previously cited Gwinn and Trenholme article that a linear detector, when used for the Campbelling technique, gives an output proportional to the RMS output as long as pulse overlap is achieved. The use of the low frequency components of the positive ion part of the current pulse utilized in the channel 20 ensure adequate pulse overlap down to average pulse rates below $2 \times 10^4$ pulses per second. Hence, the output of the logging amplifier 67 is proportional to the logarithm of the average pulse rate for pulse rates in excess of about $2 \times 10^4$ pulses per second.

The logging diodes 71 generate a small spurious offset voltage proportional to temperature and, therefore, some sort of compensation preferably is used for best results. In the illustrated embodiment, this compensation is provided by a compensating voltage from three diodes 73 which voltage is introduced into the output by means of a differential amplifier 75 coupled to the output of the logging amplifier 67. The differential amplifier 75 also provides additional linear DC voltage gain. A constant current is passed through the diodes 73 by a series connected DC voltage source 77 and a resistor 79 to keep the diodes in their correct operating range. The constant part of the voltage drop across the diodes 73 is cancelled by a bias voltage obtained from a potentiometer 81 coupled across the DC voltage source 41. This bias voltage is also employed to vary the overall level of the output signal of the differential amplifier 75 as described hereinafter.

The output voltage 83 of the Campbelling-type circuit 20 is shown in FIG. 3 as a function of pulse rate. The lower end 85 of response curve 83 in FIG. 3 is adversely affected by circuit noise and spurious background radiation (gamma radiation, alpha particles from fission chamber, etc.). To eliminate these errors the output of the differential amplifier 75 is coupled through a diode 87 and through a variable resistance 89 to the summing junction 35. The diode 87 conducts when the output voltage 83 is greater by the voltage drop of the diode than the potential of the summing junction 35 which potential is determined by the current flowing into the summing point 35 as a result of output voltage 25. This potential is low because the resistance 45 is a relatively low value. The current at the summing point produced by the Campbelling-type circuit 20 is thus added to that produced by the log count rate channel 19, the latter current being at the maximum limit corresponding to 43. As was mentioned previously, the whole response curve 83 out of the Campbelling-type channel 20 may be raised or lowered above or below zero by means of the bias potentiometer 81. Hence as that part of the output curve which is affected by spurious radiation and noise is biased below zero, it will not appear as a summing current at summing point 35. The response curve 83 then would be as if it started at point 91 of FIG. 3. The slope of the response curve at the summing point 35 may be varied by adjusting the variable resistance 89.

The signals from the Campbelling-type channel 20 and the log count rate channel 19, which are idealized by eliminating the bad portions of each, are combined in the output summing resistor 45 and fed into a noninverting DC voltage amplifier 93. Alternatively, an inverting current summing amplifier may be used instead of the summing resistance and a reversal of output polarity obtained. More particularly, the slopes of the response curves at the summing points 35 are adjusted to be the same by means of the resistor 89 and the ganged resistors 31 and 33 and the bias level (adjusted by potentiometer 81) of the output of the Campbelling-type channel 20 is adjusted so that the response curves 95 and 97 (FIG. 4), corresponding respectively to curves 25 and 83, coincide at 98. Thus, a continuous combined output voltage over the full pulse-rate range is achieved. In practice, this adjustment is made and maintained over reasonable periods with sufficient accuracy that essentially no variation from linearity in the overall output meter reading is evident. Typically, the output of the log count rate channel 19 covers an average pulse rate range from slightly less than 1 pulse per second to better than $10^5$ pulses per second. The Campbelling-type channel 20 covers a pulse rate range typically from about $2\times10^4$ pulses per second to $2\times10^6$ pulses per second. The crossover or combining point between the two is usually chosen at about $10^5$ pulses per second. Thus, the resolution counting loss which occurs above $10^5$ pulses per second in the log count rate channel 19 and the radiation and noise error which occurs in the Campbelling-type channel 20 at below $10^5$ pulses per second are both eliminated, resulting in an essentially error-free wide range channel.

It will be noted that although the particular illustrated circuit 20 is called a Campbelling-type circuit, it is actually not directly sensitive to the RMS value of the AC input signal. However, as the previously cited article points out, the average rectified signal obtained by linear detection of a random AC signal is proportional to the RMS signal for relatively high average pulse rates where pulse overlap is achieved. Since the log of the square of the average signal is equal to twice the log of the average signal, the equivalent of a log mean square signal is gained without using a square law detector system—by utilizing a linear detector and filter followed by a log amplifier and adjusting the gain of the log amplifier properly. Thus, a Campbell-type output is obtained with a minimum of complication.

A suitable meter or other type of indicator (not shown) as well as period circuits and safety triggering circuits (not shown), may be connected to the output developed across the terminals 99 and 101.

It may therefore be seen that the wide range system of the invention represents a marked improvement in apparatus for monitoring randomly occurring pulses, such as are produced by a neutron flux sensor. Use of the AC component of the pulses minimizes problems due to current drifts frequently associated with low level DC amplifiers and produces a much improved discrimination against gamma background. Included in the invention is a log mean-square circuit which provides an output representative of the log of the input pulse rate, the circuit being relatively simple in construction. A wide range system of the type described is of particular advantage in connection with monitoring neutron flux in a nuclear reactor in that a minimal number of penetrations in the biological shield are required. Moreover, the necessity to switch between various indicating systems by visual observation and manual reaction is eliminated.

Various modifications of the invention will become apparent to those skilled in the art from the foregoing description and accompanying drawings. Such modifications are intended to fall within the scope of the appended claims.

I claim:

1. Apparatus for producing an output signal generally proportional to the log of the average rate of random pulses, which rate varies over a total pulse rate range which extends substantially below and above the range of $10^4$ to $10^6$ pulses per second, comprising means employing a pulse counting technique for producing a first intermediate signal proportional to the log of the average pulse rate of the random pulses in a predetermined lower portion of the total pulse rate range, a Campbelling circuit for producing a second intermediate signal proportional to the log of the average pulse rate of the random pulses in a predetermined upper portion of the total pulse-rate range, said upper portion and said lower portion having an overlapping region in the total pulse-rate range, said first and second intermediate signals having the same proportional relation to the log of the average pulse rate, means for applying said first and second intermediate signals to an output point, means for limiting said first intermediate signal at a selected level for average pulse rates above a predetermined rate in the overlapping region, and means for cutting off said second intermediate signal for average pulse rates below said predetermined rate, thereby providing a continuous output voltage at the output point that is proportional to the log of the average pulse rate over the entire range.

2. Apparatus according to claim 1 wherein said Campbelling-type circuit includes a linear detector for producing an output signal representative of the RMS amplitude of the random pulses, and a log amplifier for producing a signal representative of the log of the output of said linear detector.

3. Apparatus according to claim 1 wherein means is provided for adjusting the slopes of said first and second intermediate signals.

4. Apparatus according to claim 3 in which the limiting means and the cutting off means are adjustable.

5. Apparatus according to claim 1 in which the pulses are provided by a neutron flux sensing means.

UNITED STATES PATENT OFFICE
CERTIFICATE OF CORRECTION

Patent No. 3,579,127                     Dated   May 18, 1971

Inventor(s)    Harold A. Thomas

It is certified that error appears in the above-identified patent and that said Letters Patent are hereby corrected as shown below:

Column 5, line 22 - for "2 x $10^0$", read "2 x $10^{10}$".

Signed and sealed this 28th day of September 1971.

(SEAL)
Attest:

EDWARD M.FLETCHER,JR.                ROBERT GOTTSCHALK
Attesting Officer                    Acting Commissioner of Patents